United States Patent
Marathe et al.

(10) Patent No.: US 12,411,847 B2
(45) Date of Patent: Sep. 9, 2025

(54) METHOD AND APPARATUS FOR OPTIMIZING A DATABASE QUERY

(71) Applicant: HUAWEI CLOUD COMPUTING TECHNOLOGIES CO., LTD., Gui Zhou Province (CN)

(72) Inventors: Arunprasad P. Marathe, Kanata (CA); Shu Lin, Kanata (CA)

(73) Assignee: HUAWEI CLOUD COMPUTING TECHNOLOGIES CO., LTD., Gui Zhou Province (CN)

( * ) Notice: Subject to any disclaimer, the term of this patent is extended or adjusted under 35 U.S.C. 154(b) by 0 days.

(21) Appl. No.: 18/091,003

(22) Filed: Dec. 29, 2022

(65) Prior Publication Data
US 2024/0220499 A1  Jul. 4, 2024

(51) Int. Cl.
*G06F 16/2453*  (2019.01)
(52) U.S. Cl.
CPC .............. *G06F 16/24542* (2019.01)
(58) Field of Classification Search
CPC ................................ G06F 16/24542
USPC ....................................... 707/718
See application file for complete search history.

(56) References Cited

U.S. PATENT DOCUMENTS

| | | | |
|---|---|---|---|
| 10,503,734 B2 * | 12/2019 | Scheibli | G06F 16/24542 |
| 11,055,352 B1 | 7/2021 | Beitchman et al. | |
| 2009/0276394 A1 | 11/2009 | Bestgen et al. | |
| 2012/0130988 A1 * | 5/2012 | Nica | G06F 16/24542 707/718 |
| 2019/0236188 A1 * | 8/2019 | McKenna | G06F 16/24565 |
| 2019/0392068 A1 * | 12/2019 | Wen | G06F 16/24545 |
| 2022/0300510 A1 * | 9/2022 | Arnold | G06F 16/21 |

OTHER PUBLICATIONS

Soliman et al., "Orca: A Modular Query Optimizer Architecture for Big Data", SIGMOD 2014, Snowbird, UT, USA. ACM, 337-348, Jun. 22 to 27, 2014.
Marathe et al., "Integrating the Orca Optimizer into MySQL," The 25th International Conference on Extending Database Technology, EDBT 2022, Edinburgh, UK, OpenProceedings.org, 2022, pp. 511-523, Mar. 29 to Apr. 1, 2022.

* cited by examiner

*Primary Examiner* — Kimberly L Wilson (57) ABSTRACT

There is provided a method and apparatus for optimizing a database query. Embodiments expand the scope of query optimization to two or more query optimizers. Therefore, a larger class of plan trees can be explored, and a more optimal (for example faster) physical plan may be chosen for execution. The query will continue to be executed by the "original", "home" or "first" query execution engine, and therefore, a translation or conversion mechanism is be put into place that is able to convert the chosen physical plan into a format that is acceptable to the original optimizer.

21 Claims, 10 Drawing Sheets

METHOD AND APPARATUS FOR OPTIMIZING A DATABASE QUERY

CROSS-REFERENCE TO RELATED APPLICATIONS

This is the first application filed for the present invention.

FIELD

The present disclosure pertains to the field of databases and in particular to a method and apparatus for optimizing a database query.

BACKGROUND

A database management system (DBMS) is software for storing and retrieving a user's data while considering appropriate security measures. A DBMS includes a group of programs that can manipulate the data within a database, wherein the DBMS can accept a request for data and instructs the operating system associated with the database to provide the specific data satisfying the request parameters.

Figure 1:
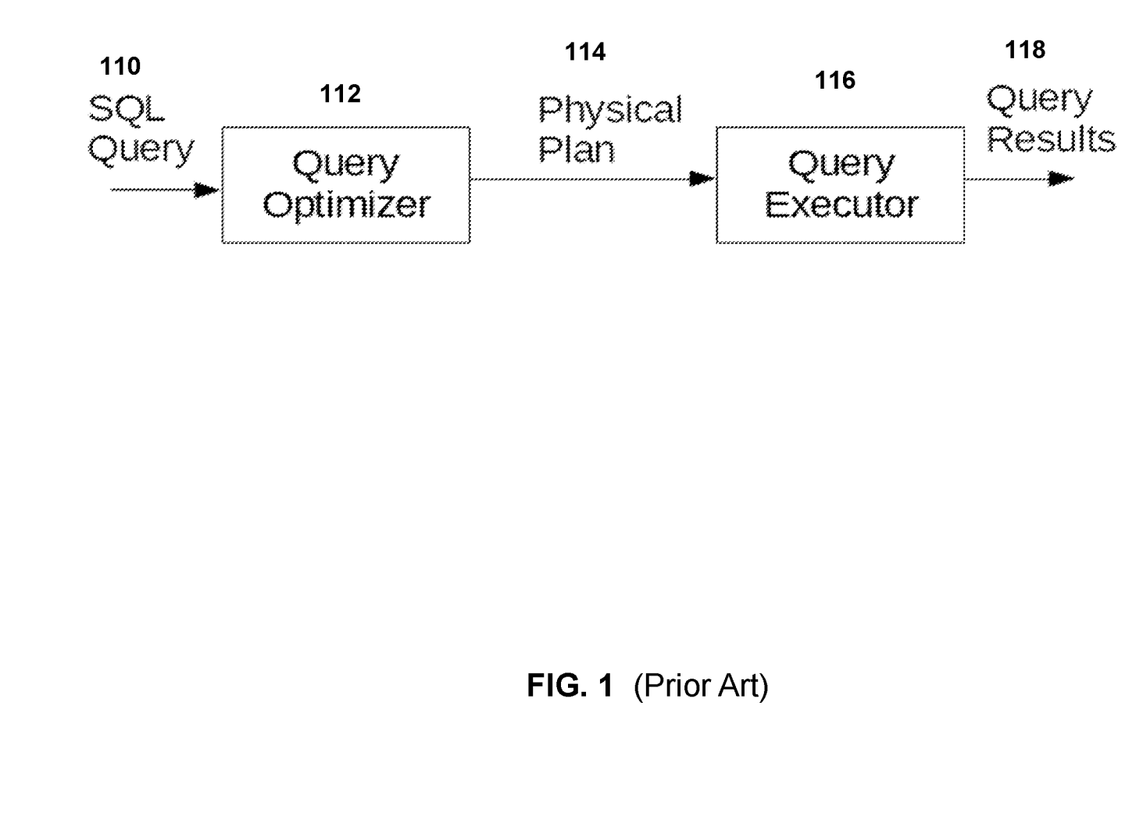
FIG. 1 illustrates a sequence of steps from a query to a query result according to the prior art.

For example, with reference to FIG. 1, a DBMS can accept a query 110, for example as defined in the structured query language (SQL) as input, and produce query results 118 as output, which for example may include a set of rows and possibly include duplicates. A query undergoes processing before the results are available, for example the query can be processed by a query optimizer 112 and then a query executor 116. The query optimizer can convert the query to a tree structure called a physical plan 114 and the query executor can evaluate the nodes in the physical plan in order to generate the query results. However, depending on the format of the query and an optimizer's sophistication, the optimizer associated therewith may have limitations relating to options that are available for the optimization of the query. This can result in a less than optimal physical plan being generated.

Therefore, there is a need for a method and apparatus for optimizing a database query that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present disclosure is to provide a method and apparatus for optimizing a database query.

In accordance with embodiments, there is provided a method for optimizing a database query. The method includes receiving a database query by a first query optimizer. Upon determination that the database query is complex, the method includes generating and transmitting information indicative of the database query to a second query optimizer and receiving from the second query optimizer a physical plan indicative of the database query. The method further includes converting the physical plan from the second query optimizer into a skeleton plan associated with the first query optimizer. The method additionally includes refining the skeleton plan into a physical plan of the first query optimizer and transmitting the physical plan of the first query optimizer to a query executor.

In some embodiments, upon determination that the database query is non-complex, the method further includes optimizing the database query into a skeleton plan associated with the first query optimizer. The method further includes refining the skeleton plan into a physical plan of the first query optimizer and transmitting the physical plan of the first query optimizer to a query executor.

In some embodiments, upon receipt of the database query, the method further includes performing logical transformations to the database query to generate an abstract syntax tree (AST) format of the database query. In some embodiments, the method further includes preparing for cost-based optimization, including generating a modified AST format of the database query. In some embodiments, the information indicative of the database query is configured as a logical tree associated with the second query optimizer.

In some embodiments, the first query optimizer is selected from the group comprising MySQL, SQL Server, DB2, Oracle, PostgreSQL, Orca and SQLite or other similar relational database management systems. In some embodiments, the second query optimizer is different from the first query optimizer, the second query optimizer selected from the group comprising MySQL, SQL Server, DB2, Oracle, PostgreSQL, ORCA and SQLite or other similar relational database management systems.

In some embodiments, the database query has associated therewith a number of tables and wherein determining complexity of the database query is at least in part based on the number of tables. In some embodiments, determining complexity is at least in part based on a cost associated with the first query optimizer.

In some embodiments, the method further includes generating the information indicative of the data base query configured as a logical tree associated with the second query optimizer.

In some embodiments, the method further includes generating and transmitting information indicative of the database query to a third query optimizer and receiving from the third query optimizer a physical plan indicative of the database query. The method further includes converting the physical plan from the third query optimizer into a skeleton plan associated with the first query optimizer and refining the skeleton plan into a physical plan of the first query optimizer.

In accordance with embodiments, there is provided an apparatus for optimizing a database query. The apparatus including a processor and a memory storing thereon machine executable instructions. The instructions, when executed by the processor configure the apparatus to perform one or more of the methods disclosed above or elsewhere herein.

In accordance with embodiments, there is provided a computer program product including a computer readable memory storing computer executable instructions thereon. The instructions, when executed by a computer perform one or more of the methods defined above or elsewhere herein.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

According to embodiments of the instant application, there is provided a method and apparatus for optimizing a database query. Embodiments expand the scope of query optimization to two or more query optimizers. Therefore, a larger class of plan trees can be explored, and a more optimal (for example faster) physical plan may be chosen for execution. The query will continue to be executed by the "original" or "home" query execution engine, and therefore, a translation or conversion mechanism is be put into place that is able to convert the chosen physical plan into a format that is acceptable the original optimizer.

It is understood that data structures representing the physical plans produced by different query optimizers are typically mutually incompatible. However, a plan summary extracted from a potentially faster physical plan may act as a "seed" or blueprint from which a second optimizer may be able to grow or generate the rest of the physical plan that is executable by the second optimizer.

Figure 2:
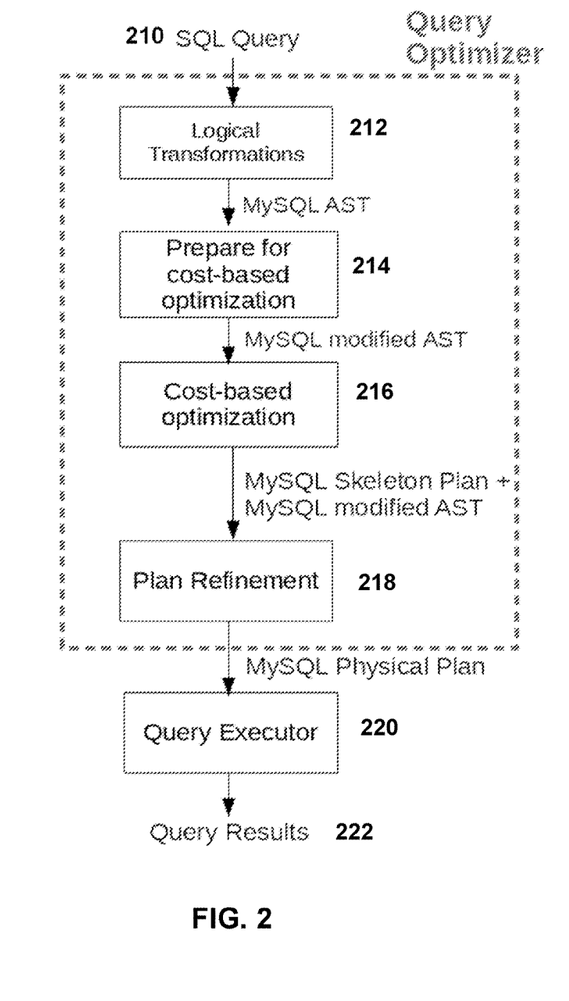
FIG. 2 illustrates a sequence of steps from a query to a query result.

With reference to FIG. 2 a sequence of steps from initial receipt of a database query to the determination of query results is illustrated for the MySQL DBMS. For this discussion the database query is defined as a structure query language (SQL) query to be executed by MySQL, however it will be readily understood that any other relational DBMS can be used instead MySQL, wherein samples of other DBMS systems are Oracle, SQL Server, PostgreSQL, and the like, as would be readily understood. Initially, a SQL query 210 is received by a query optimizer. A SQL query can be defined as a data extraction specification written in SQL, wherein a key characteristic of this format is that "what" data needs extraction is specified, however "how" the data is to be identified is left unspecified.

A query optimizer is a key component of database management system software which produces a recipe, for example a physical plan, for evaluating a query expressed using the SQL query language, for example a SQL query optimizer will produce a physical plan for queries expressed in the SQL language. As can be appreciated, there can many possible physical plans for any non-trivial query, and the operational performance of these possible physical plans can vary by orders of magnitude. Therefore, it can be important that a query optimizer chooses or selects (and essentially outputs to the query executor) a relatively fast or efficient physical plan even if that query optimizer cannot always find the "fastest" or "most efficient" physical plan.

With further reference to FIG. 2, upon receipt of the SQL query 210, the query optimizer can perform one or more logical transformations 212. Many logical transformation or rewrite rules exist for the SQL language. For example, equivalency rules for joins, selections, and projections. During logical transformation phase, such rules are systematically applied, and the result is an equivalent tree that is likely to be faster to execute. Subquery conversion (into semi-joins or derived tables) and scalar simplifications are also performed during the logical transformation phase. The output of the logical transformation phase is indicative of the query and can be defined in a MySQL abstract syntax tree (AST) format.

The output from the logical transformation stage is input to the stage reflective of a preparation for cost-based optimization 214. This stage can include actions including constant table detection, condition fan-out estimation, range access analysis, and ref access (point access) analysis being are performed. The output of the "prepare for cost-based optimization" stage is query specific and can be defined in a MySQL modified AST format.

The output of the "prepare for cost-based optimization stage" is input to the "cost-based optimization" stage 216. This stage can determine the individual access methods for the various tables in a query block, and can determine how the tables are joined, for example two at a time. The overall approach for the cost-based optimization stage is to associate costs with various nodes of a tree or tree structure, and thus, produce the total cost associated with the evaluation of the particular tree. It is understood that a tree or tree structure is a way of representing the hierarchical nature of data processing, starting from a root node, transitioning through intermediate nodes and ending with leaf nodes. The cost associated with a query can be unit-less, however the cost may correlate with the query's actual execution time, however other costs may include complexity of the actions to be performed, resources needed in order to perform the actions or other costs as would be readily understood. The output of the cost-based optimization stage can be a skeleton plan wherein depending on the query format the MySQL modified AST format indicative of query can additionally be considered as output. It is to be understood that for a MySQL query optimizer the AST format can be used beyond the cost-based optimization stage, however, other query optimizers may not continue to use AST format beyond cost-based optimization phase.

According to embodiments, a skeleton plan is a simplified physical plan tree in which certain details indicative of the initial query are maintained. For an analogous concept, a skeleton plan is a pruned tree configuration of a full physical plan tree. For example, according to embodiments, a skeleton plan can include particular and selected details relating to the leaf nodes, non-leaf node, the structure of the leaf node and non-leaf nodes. For leaf nodes which can represent permanent or temporary tables, a skeleton plan can include the access methods for the leaf nodes, for example is the method "table-scan" or "index-scan". For non leaf node which can represent internal nodes including the root node, the skeleton plan can include the join strategy chosen. For the structure of the leaf nodes and the non-leaf nodes, the skeleton plan can include how these nodes are connected, for example using a parent-child relationship or a left-right sibling relationship. According to embodiments, for a distributed physical plan, the skeleton plan can include nodes that implement a data distribution strategy, for example, a shuffle strategy or a broadcast strategy. According to embodiments, physical plan tree nodes that are not present in a skeleton plan can include filter predicates, column projections, scalar aggregations, non-scalar aggregations, "TOP N" expressions, row-order enforcers and similar nodes as would be readily understood by a worker skilled in the art.

The output of the "cost-based optimization" stage is input to the "plan refinement" stage 218. This stage can include the handling of a plurality of data processing operations. The data processing operations can include data aggregations, group-level filtering, predicate pushdown, row limit enforcement and other data processing operations as would be readily understood by a worker skilled in the art. The output of the plan refinement stage is the physical plan. A physical plan or physical tree for a query can be considered to be the most detailed recipe for a query's evaluation. The multiple choices mentioned for the various logical tree nodes are finalized, for example a "join" logical operator can be specialized to a "nested loop join" operator.

Upon the evaluation of the physical plan, the plan is subsequently transmitted to the query executor 220. The physical plan, for example, in the form of a tree with leaves at the bottom and the root at the top can be executed by the query executor, wherein this execution may be performed in a pipelined fashion. The data can be gradually processed bottom-up in the tree, and the query results 222 can be made available after evaluation of the tree to the root node.

Figure 3:
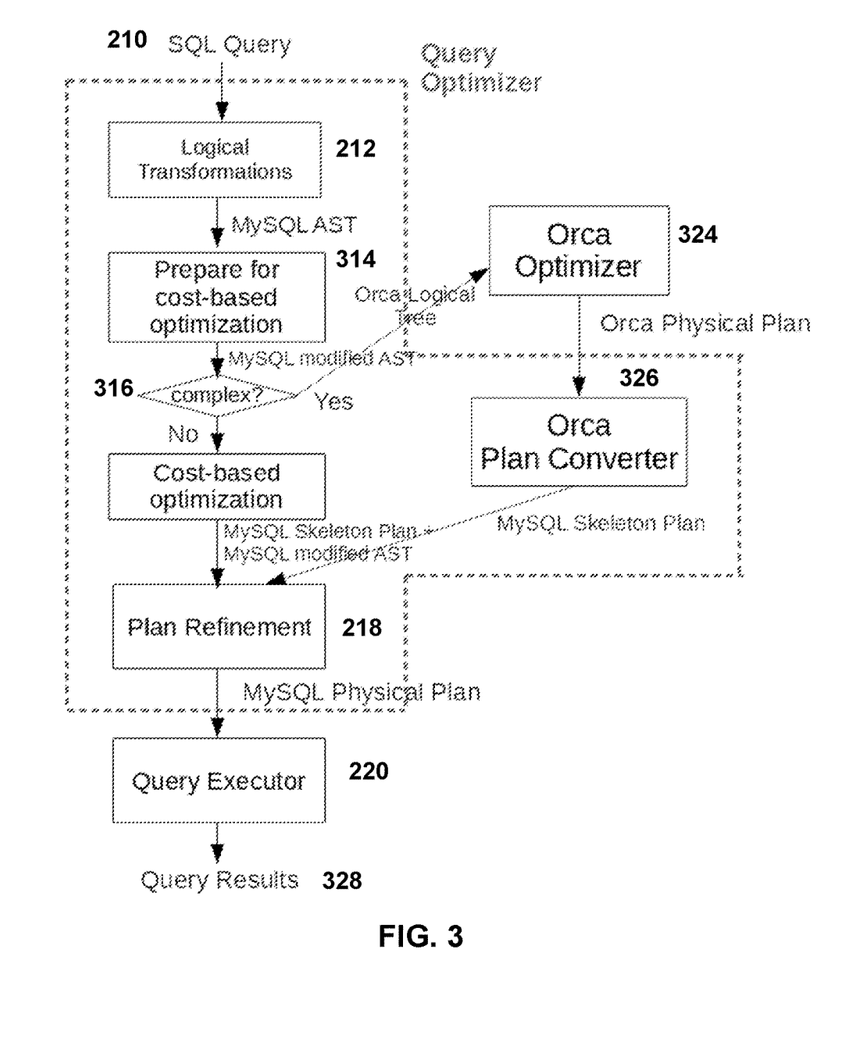
FIG. 3 illustrates a sequence of steps from a query to a query result, according to embodiments.

FIG. 3 illustrates a sequence of steps from a query to a query result, according to embodiments. While FIG. 3 is similar to FIG. 2, FIG. 3 includes a second query optimizer which can be configured to perform query optimization according to a different set of considerations when compared to the cost-based optimization 216 as illustrated in FIG. 2. It is readily understood that for the example illustrated in FIG. 3, while the first query optimizer has been represented as MySQL, a different query optimizer may be used, for example SQL Server, DB2, Oracle, PostgreSQL, Orca, SQLite or other query optimizers as would be readily understood. Furthermore, it is also readily understood that for the example illustrated in FIG. 3, while the second query optimizer has been represented as Orca, a different query optimizer may be used, for example MySQL, SQL Server, DB2, Oracle, PostgreSQL, SQLite or other query optimizer as would be readily understood.

With respect to FIG. 3, upon performance of the "logical transformation" 212 stage a "prepare for cost-based optimization" 314 stage is performed. While similar to the "prepare for cost-based optimization" 214 stage as illustrated in FIG. 2, "prepare for cost-based optimization" 314 stage further includes the creation of a logical tree that can be compatible with the second query optimizer.

According to embodiments, a logical plan or logical tree for a database query can be defined as a detailed data extraction and processing recipe expressed in the form of a tree. Conceptually, the leaf nodes are evaluated first; then the nodes immediately above leaf nodes; and so on. Finally, the query result is available at the top node of the tree, namely the root node. The individual plan tree nodes may be evaluated using multiple choices, and those choices are left unspecified. For example, a "join" operator in a logical plan does not specify whether a nested loop join, hash join, or merge join will eventually be chosen to implement the join operator.

For example, in the embodiment illustrated in FIG. 3, the second query optimizer is an Orca optimizer, and thus the logical tree created can be configured to be compatible with the Orca optimizer. As would be understood, each query optimizer may expect a somewhat different logical tree as input, although the differences may not be as pronounced as they would be in the case of the physical trees.

Upon completion of the "prepare for cost-based optimization" 314 stage, a query complexity check 316 is performed. According to embodiments, not all queries are routed to the second query optimizer, for example the Orca optimizer, because re-routing to the second query optimizer incurs a cost, and as such the resulting benefit should outweigh the cost. A MySQL optimizer is understood to optimize simple, for example non-complex, queries adequately well, and therefore, only complex queries may be considered for re-routing to Orca for optimization. It is understood that different query complexity tests are possible. A complexity test can be based on the number of tables appearing in a query. For example, if there are at least three tables appearing in the query, transitioning to Orca for optimization may be desired, else not. It is to be understood that while the query complexity check 316 is denoted by a separate node in FIG. 3, it may be conceptually combined with or performed during the "prepare for cost-based optimization" 314 stage.

It will be readily understood that while the instant application has been discussed with respect have access to a first query optimizer and a second query optimizer, more than two different query optimizers can be used. For example, three different query optimizers can be used wherein during the complexity check there can be an evaluation of which of the three query optimizers would be most beneficial for optimizing the received database query. It is understood that the determination of the most suitable query optimizer can be based on the specific characteristics of the query optimizer, and whether those specific characteristics match, for example through the evaluation of threshold or other evaluation technique, with the query characteristics. For example, parallel query execution plans may be expected from an optimizer known to produce good parallel plans. Distributed query execution plans may be preferred from a different optimizer that specializes in such plans.

Upon determination that the query is complex, the logical tree generated during the "prepare for cost-based optimization" 314 stage, can be transmitted to the second query optimizer, wherein in this example it is the Orca optimizer 324. The Orca query optimizer 324, can be considered to have a larger plan exploration space, and larger set of tree transformation rules when compared with a MySQL optimizer. The Orca query optimizer 324 converts the logical tree into an Orca physical plan tree or Orca physical tree. This Orca physical tree is subsequently transmitted to an Orca plan converter 326, which traverses the Orca physical plan tree, and outputs a skeleton plan, wherein the skeleton plan is compatible with the first query optimizer, in this example, the MySQL query optimizer.

The subsequent steps illustrated in FIG. 3 can be considered to be performed in a similar manner as to those discussed with respect to FIG. 2. Different physical plans for a query must generate the same results. Therefore, it will be readily understood that even if a different query optimizer may have been used with respect to the SQL query 210, the query results 328 illustrated in FIG. 3 will be identical to the query results 222 in relation to FIG. 2 even if the query optimizer used for the generation of the skeleton plan is different when comparing FIG. 2 and FIG. 3.

It will also be readily understood that each of the elements or outputs that are discussed herein, for example, with respect to FIG. 3, will be compatible with the subsequent stage discussed herein. For example, if the second query optimizer is different from Orca, then the logical tree that is generated during the "prepare for cost-based optimization" 314 would be compatible with the so selected second query optimizer. Moreover, the "plan converter" which is illustrated in FIG. 3 as an Orca plan converter 326, will be configured to perform suitable transformations of a so selected different second query optimizer's physical tree to a so selected first query optimizer's skeleton plan as would be readily understood.

Figure 4:
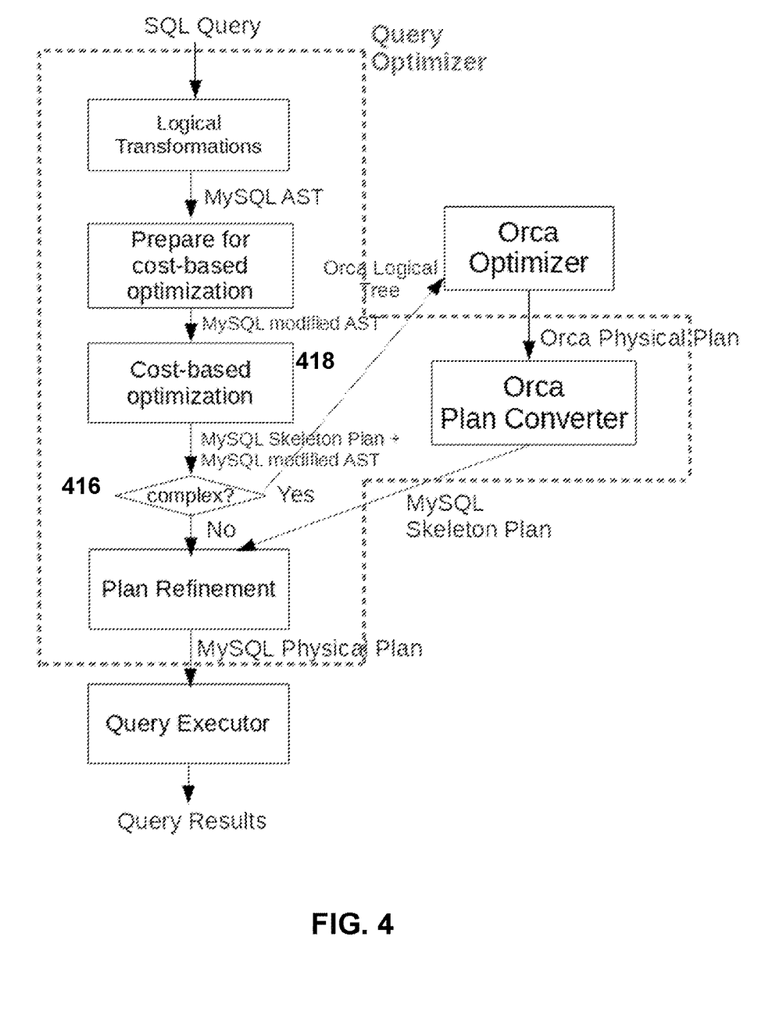
FIG. 4 illustrates a sequence of steps from a query to a query result, according to embodiments.

FIG. 4 illustrates a sequence of steps from a query to a query result, according to embodiments. While FIG. 4 is similar to FIG. 3, in FIG. 4 the complexity check 416 is performed after the cost-based optimization 418 stage. In this embodiment, the complexity check 416 can be performed based on information relating to the skeleton plan generated during the "cost-based optimization" 418 stage, in addition to the query defined in a modified AST format. Given that during the "cost-based optimization" 418 stage an estimated execution cost of a query becomes known, and therefore, complex queries are those whose estimated execution costs exceed a threshold value. An advantage of this embodiment is that the number of tables appearing in a query can be considered a rudimentary cost measure, whereas a cost measure based on estimated execution cost can be considered more realistic. It is understood that some queries accessing just a few tables may be long-running (for example considered costly), whereas some multi-table queries may run very fast (for example considered cheap).

In some embodiments, the sequence of steps from a query to a query result illustrated in FIG. 4 include other variations of query complexity determination. For example, query complexity can be based on a combination of the number of tables and the estimated execution cost determined during the cost-based optimization 418 stage. In addition or alternately, for example query complexity can be based on the inclusion of certain features that the first query optimizer is known to be not particularly good at optimizing, which may include one or more of common-table expressions, deeply nested subqueries, recursion, windowing functions, complex aggregates and the like.

Figure 5:
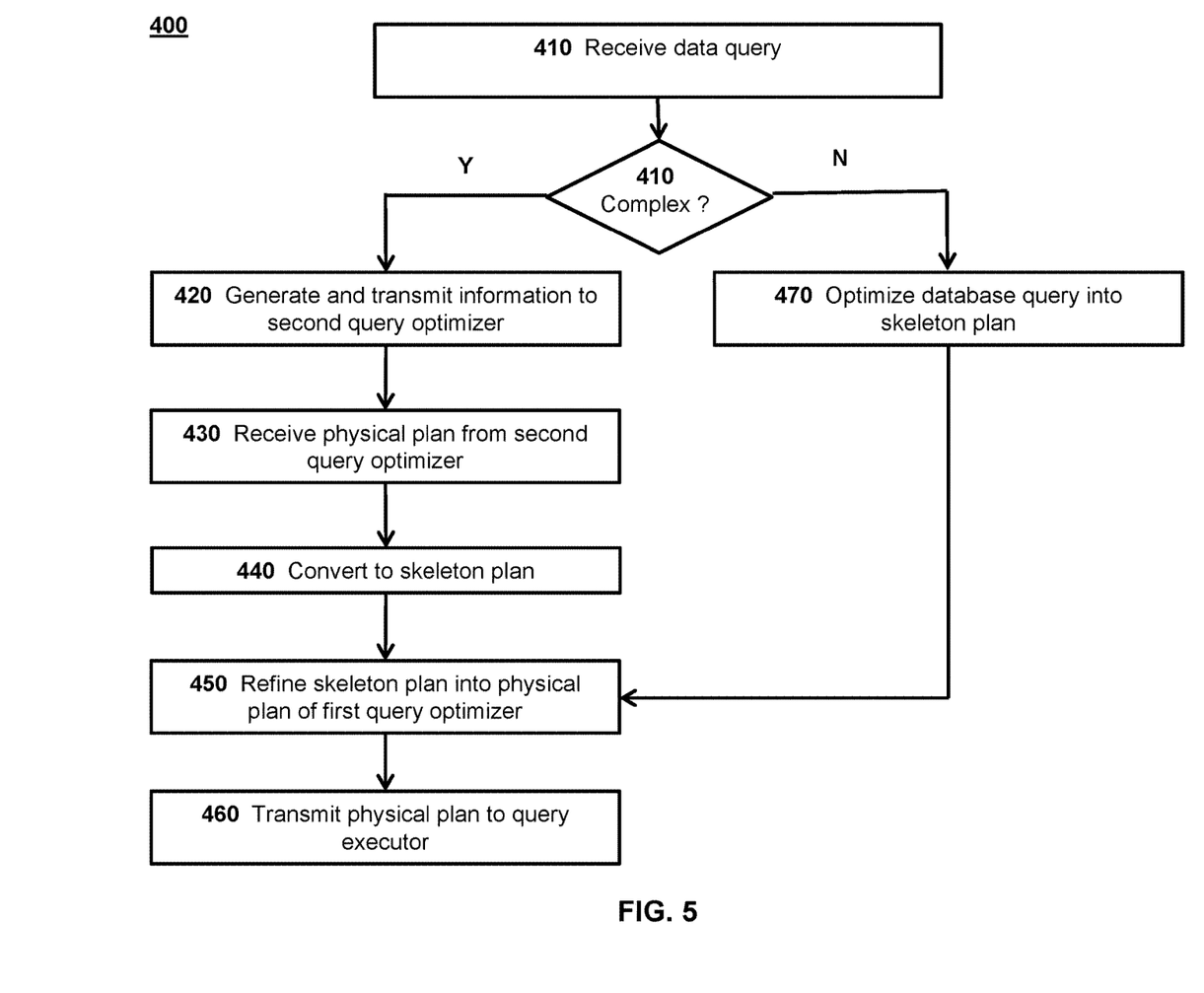
FIG. 5 illustrates method for database query optimization, according to embodiments.

According to embodiments, and with reference to FIG. 5, there is provided a method method 400 for optimizing a database query. The method includes receiving 410 a database query by a first query optimizer. An evaluation of complexity 410 will subsequently be performed. Upon determination that the database query is complex, generating and transmitting 420 information indicative of the database query to a second query optimizer. The method further includes receiving 430 a physical plan from the second query optimizer indicative of the database query and converting 440 the physical plan from the second query optimizer into a skeleton plan associated with the first query optimizer. The method further includes refining 450 the skeleton plan into a physical plan of the first query optimizer and transmitting 460 the physical plan of the first query optimizer to a query executor.

According to some embodiments, generating the information indicative of the database query includes generating the information configured as a logical tree associated with the second query optimizer.

According to some embodiments, upon determination that the database query is non-complex, the method further includes optimizing 470 the database query into a skeleton plan associated with the first query optimizer. The method subsequently includes refining 450 the skeleton plan into a physical plan of the first query optimizer and transmitting 460 the physical plan of the first query optimizer to a query executor.

In some embodiments, upon receipt of the database query, the method includes performing logical transformations to the database query to generate an abstract syntax tree (AST) format of the database query. In some embodiments, preparing for cost-based optimization includes generating a modified AST format of the database query.

In some embodiments, the information indicative of the data base query is configured as a logical tree associated with the second query optimizer. In some embodiments, the first query optimizer is MySQL and the second query optimizer is ORCA.

In some embodiments, the database query has associated therewith a number of tables and determining the complexity of the database query is at least in part based on the number of tables. In some embodiments, determining complexity of the database query is at least in part based on a cost associated with the first query optimizer.

According to some embodiments, considering the first query optimizer is MySQL and the second query optimizer is an Orca optimizer, an overview of some steps performed can be envisioned as follows. A determination of whether a query Q submitted to MySQL should be routed to Orca for query optimization is made. The determination can be based on the deemed complexity of the query, for example only complex queries are sent to Orca because MySQL is known to be a decent query optimizer for relatively simple queries. The query Q's logical representation (also known as "logical tree" or "logical format") is sent to Orca along with metadata information needed to optimize query Q. Such metadata information includes table names, table column names, column types, column histograms, column integrity constraints, and so on. The Orca optimizer optimizes query Q from its logical tree and the associated metadata information, and produces a physical plan known as the "Orca physical plan". Using a tree traversal algorithm, a plan summary is extracted from the Orca physical plan. The plan summary is called the "skeleton plan". The skeleton plan is inserted into the MySQL query optimization workflow at the correct place that expects a skeleton plan as input. The MySQL query optimization workflow converts the skeleton plan to another physical plan called "MySQL physical plan". MySQL physical plan is executed by the MySQL executor to produce query results which are then sent to the user or application that submitted query Q.

According to embodiments, the skeleton plan can be defined as a tree structure whose leaves are table nodes with their associated access methods (table scan, index scan, index seek, and so on). The internal (non-leaf) nodes are data-join nodes with their associated join methods (nested loop join, hash join, merge join, and the like). It is to be understood that the above discussion in relation to a skeleton plan is non limiting and can be extended to include other node types. For example, a skeleton plan can include grouping aggregation nodes (of type sort or hash); sort nodes; data distribution annotations to join nodes (collocated, exchange, or broadcast); common table expressions of varying generalities (for example, ("a=5") or ("a=5 OR a=10")) and the like.

According to some embodiments, the first query optimizer is MySQL and the second query optimizer is an Orca optimizer. The Orca plan converter can be configured according to the following tree-traversal algorithm which can extract a skeleton plan from an Orca physical plan. It is understood that this is merely an example of an implementation of a plan converter and depending on the first query optimizer and the second query optimizer, the specifics of the plan converter can be suitably modified to be compatible with the respective query optimizers.

MySQL query optimization is query block-scoped, whereas Orca optimizer takes a holistic view of a query by considering all of the query blocks together. Because Orca's potentially faster physical plans are eventually to be translated into MySQL query plans, MySQL query block structures need to be considered during the Orca physical plan traversal, although Orca optimization itself is not query-block-scoped.

A TABLE_LIST is a MySQL logical tree data structure representing a table reference in a query block; the table can be permanent or temporary. For example, if a table appears twice in a query block, they have distinct TABLE_LIST objects. Given a table reference's TABLE_LIST object, it is possible to determine the query block the table belongs to by following a pointer. Such TABLE_LIST pointers are put inside the leaf nodes of an Orca logical tree when that tree is passed to the Orca optimizer. During Orca tree transformations, these TABLE_LIST pointers move along with their container leafs as well. For example, when Orca translates a logical "access lineitem table" leaf node to the physical "index-scan on lineitem" leaf node, the TABLE_LIST pointer is copied over to the physical node too.

If a query has T query blocks, the overall goal of the tree traversal algorithm is to create T subtrees, one for each query block, and together, they form the query's skeleton plan.

According to some embodiments, when the first query optimizer is MySQL and the second query optimizer is Orca the plan converter can perform the following steps. Traverse the nodes of the Orca physical plan in post-order. Suppose that the node being visited is N. Various actions are taken based on the type of N. When the traversal begins, there is no "current query block" and there is no "current visited" tree.

Step 1: If N is a leaf node, and there is no current query block, initiate a new query block and set it to N's query block in MySQL, for example found using the TABLE_LIST pointer contained in N. In this case, there will be no "current visited" tree either, so create a new single-node tree with N in it. If there is already a current query block, and N's query block in MySQL, for example found using the TABLE_LIST pointer, does not change, add N to the "current visited" tree at the appropriate place.

Step 2: If N is a leaf node, there is a current query block, and N's query block in MySQL, for example found using TABLE_LIST pointer, is different from the current query block, initiate a new query-block with its own "current visited" tree containing N.

Step 3: If N is a non-leaf node and N's type is anything other than some type of join, skip N. For example, such nodes may include scalar expressions, filters, and aggregations and thus are skipped.

Step 4: If N is a join node, determine the MySQL query block to which N belongs, for example N's left child's query block (L); N's right child's query block (R); or neither. By consulting MySQL TABLE_LIST pointers for L and R, the situation can be resolved. There are three cases to consider. For the first case, if L is R's parent, N belongs to L's query block. Accordingly, add N to L's "current visited" tree at the appropriate place. For the second case, if R is L's parent, N belongs to R's query block. Accordingly, add N to R's "current visited" tree at the appropriate place. For the third case, if neither L nor R are the other's parent, Orca has changed query block structure drastically, and Orca optimization needs to be aborted.

If one of N's children begins a subquery which Orca has decorrelated, namely correlated subqueries has been rewritten such that the rewritten form no longer has correlation, convert the subquery to a derived table, and set that derived table's node-ID to N'. Add N' to the current query block's "current visited" tree at the appropriate place.

Step 5: In some instances, Orca may change query block structure to such an extent that a "current visited" tree does not match the corresponding MySQL query block. In that case, Orca optimization is aborted and MySQL is activated as the optimizer, namely MySQL optimizes the database query.

As previously noted, if the query being optimized has T query blocks, the Orca physical plan traversal creates a collection of T "current visited" trees, and together, they are the query's skeleton plan.

Figure 6:
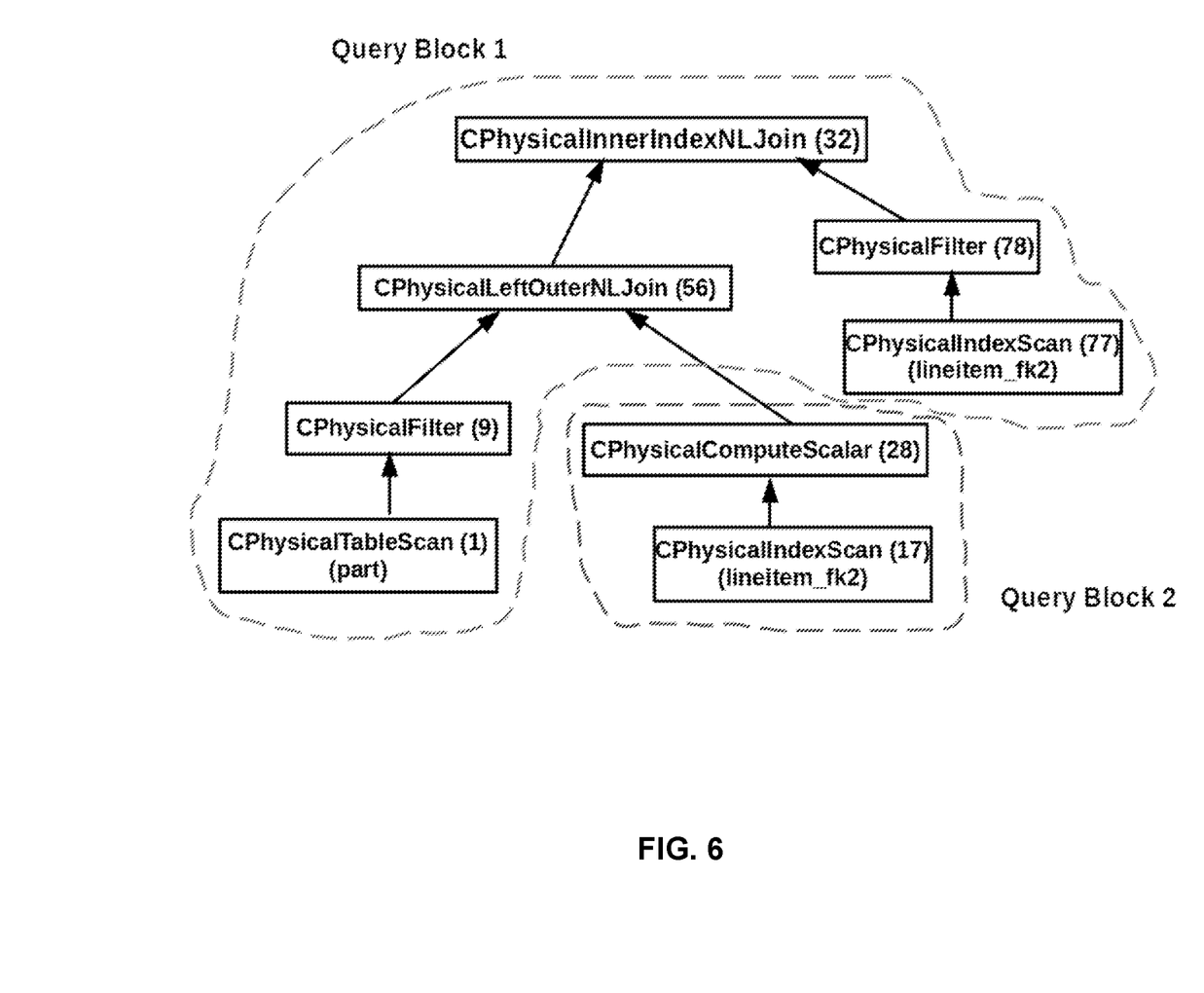
FIG. 6 illustrates an Orca physical plan tree to be traversed using the transversal algorithm, according to embodiments.
Figure 7:
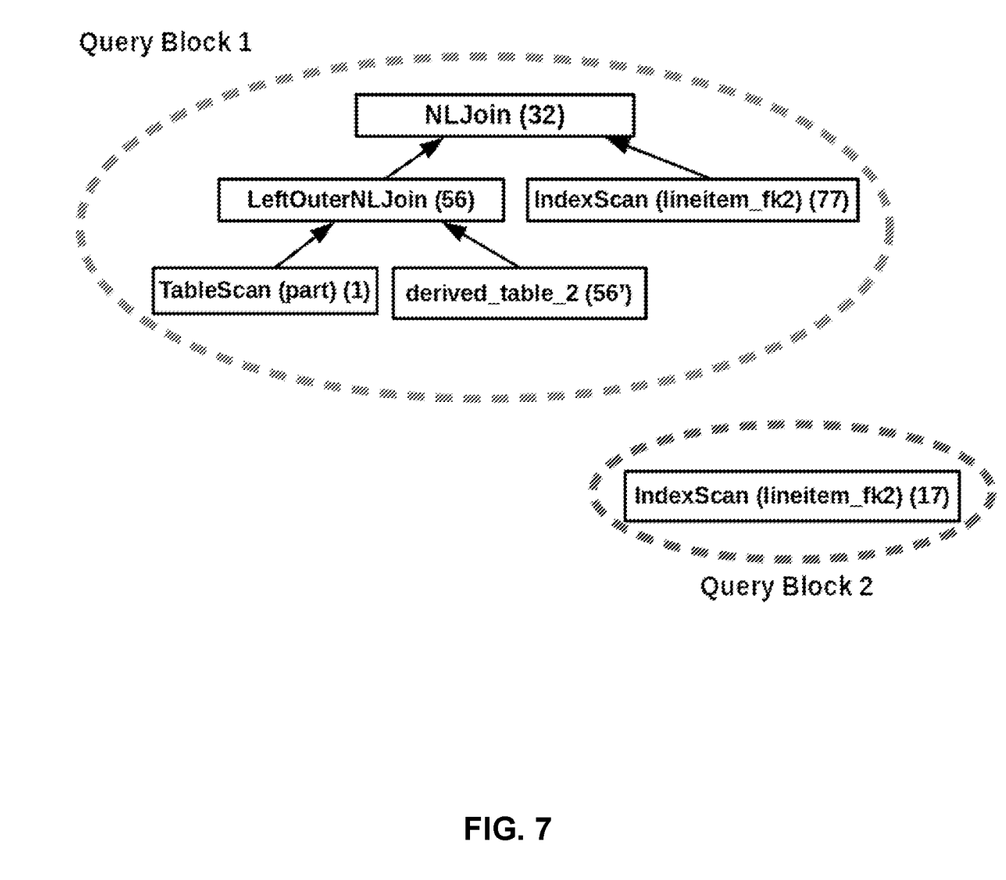
FIG. 7 illustrates a skeleton plan derived from the Orca physical plan tree illustrated in FIG. 6, according to embodiments.

As an illustration, FIG. 6 illustrates an Orca physical plan tree to be traversed using the transversal algorithm, according to embodiments. FIG. 7 illustrates a skeleton plan derived from the Orca physical plan tree illustrated in FIG. 6, according to embodiments. It is noted that in this example, the first query optimizer is MySQL and the second query optimizer is Orca.

The post-order traversal of the plan tree is: [1, 9, 17, 28, 56, 77, 78, 32]. The first leaf visited is 1, and a new query block called Query Block 1 in FIG. 7 is initiated, and the first "current visited" tree contains just 1. The next node 9 is skipped. When the traversal visits 17, the MySQL query block changes and therefore, a new "current visited" tree is initiated containing just 17. The new query block itself is indicated using Query Block 2 in FIG. 7. The next node 28 is skipped. The next node visited is 56 and is determined to belong to Query Block 1. Furthermore, node 56's right child begins a decorrelated subquery, and therefore, the resulting derived table is given the node-ID of 56' and is put in 56's query block. The next node 77 is also put in the Query Block 1. The next node 76 is skipped. Finally, node 32 is also put in Query Block 1. At the end, the skeleton plan includes the two "current visited" subtrees illustrated in in FIG. 7Error! Reference source not found. It is noted that the node names in the skeleton plan are MySQL-style because that plan will be subsequently processed by MySQL (which in this example is the first query optimizer).

According to some embodiments, when the first query optimizer is "X" and the second query optimizer is "Y", the plan converter can generally perform the following modifications to Steps 1 to 5 as discussed elsewhere herein.

At Step 3, X may want Y to optimize placements of aggregations too. In such a case, aggregation nodes are part of a skeleton plan, and should not be skipped during this step.

At Step 5, it is desired that Y provides switches to disable certain optimization strategies. For example, MySQL optimizer's work delegation to Orca disabled merge joins of Orca because MySQL does not have merge joins. If Y provides no methods to disable optimization strategies, the 'query block structure' check may need to be extended. For example, X may only support 'sort' aggregations, but not 'hash' aggregations. If Y chooses a hash aggregation, such a plan may have to be abandoned.

For Steps 1, 2, 4 and 5, query block identifications in these steps are needed given that an Orca physical plan tree contains no indications of query blocks. If Y's physical plan has query blocks identified, only Step 3 is adequate. In addition, when creating "current visited" trees, additional node attributes may have to be copied from Y to X. For aggregation nodes, for example, aggregation method and column names will have to be copied. For distributed plans, data distribution strategy, for example, collocation, shuffle, or broadcast can be copied over.

Figure 8A:
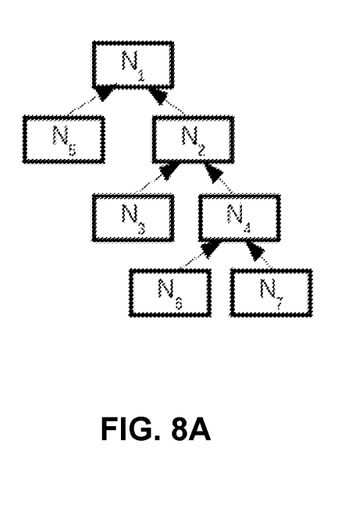
FIG. 8A illustrates a right-deep tree shape for a physical plan.
Figure 8B:
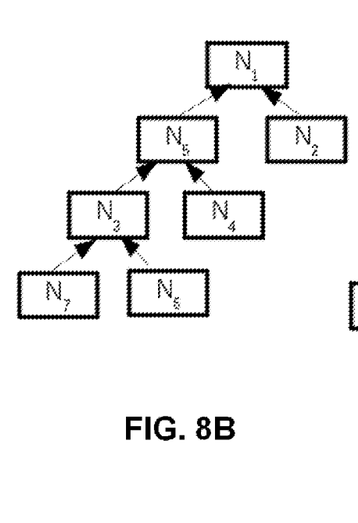
FIG. 8B illustrates a left-deep tree shape for a physical plan.
Figure 8C:
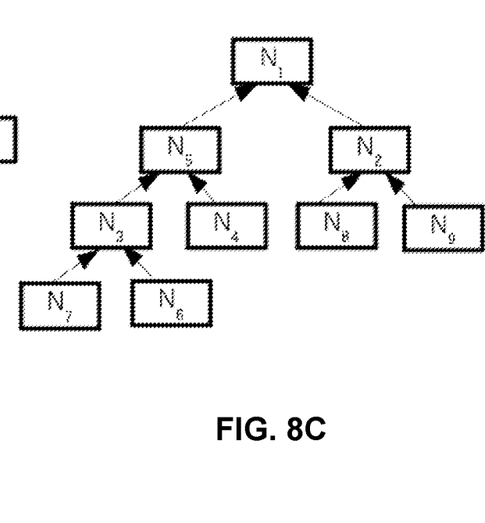
FIG. 8C illustrates a bushy tree shape for a physical plan.

FIGS. 8A, 8B and 8C illustrate three types of tree shapes whose structural properties differ. FIG. 8A is a right-deep tree shape, FIG. 8B is a left-deep tree shapes and FIG. 8C is a bushy tree shape. For this example, the first query optimizer is MySQL and the second query optimizer is Orca, and the following steps can be taken in order that a skeleton plan generated by Orca is compatible with MySQL. It is understood that MySQL may only evaluate query operators arranged in certain tree shapes, and thus the skeleton plan received from Orca should be compatible with one of those shapes. As a specific example, MySQL can only explore left-deep tree shapes when considering join ordering. Query plans produced by Orca that are not left-deep may require special handling, for example require conversion, before they can be executed by MySQL. In this example, MySQL forces Orca to produce only left-deep physical trees. This requirement can be enforced in at least two ways. First, inside Orca, flags can be created, or existing flags may be reused, that limit Orca to explore only left-deep join-order tree shapes. Second, if Orca produces a non-left-deep tree, MySQL can ignore Orca's physical plan and abandon the Orca detour and produce a MySQL physical plan by itself.

It will be readily understood that the above is merely an example having specific regard to MySQL and Orca being the first query optimizer and the second query optimizer, however work can be delegated to other query optimizers too, and those optimizers may handle tree shapes, join orders, aggregation methods, sorting methods, and so on differently. It should be appreciated that those skilled in the art can delegate query optimization work to many such optimizers, and not just Orca which herein is merely being used as an example. As such, considerations for the specific operation or selection of tree shapes can depend on the specific query optimizer selected or assigned to as the first query optimizer and the second query optimizer.

Figure 9:
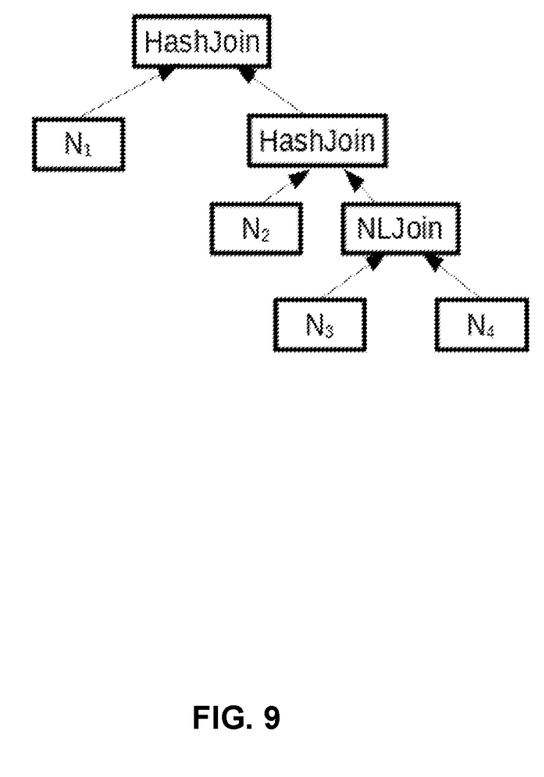
FIG. 9 illustrates a type of bushy tree shape permitted by MySQL.

It is understood that a recent version of MySQL supports limited types of bushy trees in which hash joins may have bushy right subtrees as long as their probe sides are leaf nodes, for example tables. An example of such a tree appears is illustrated in FIG. 9. As such, it would be readily understood that if Orca only produced such tree structures similar to that as illustrated in FIG. 9, MySQL can execute them without further modification of the tree shape configuration.

According to some embodiments, when the first query optimizer is MySQL and the second query optimizer is Orca, the plan converter can perform the steps as defined elsewhere herein. The steps may further include after creating the skeleton plan, verifying that all of the subtrees have the desired property, for example, left-deep or "limited bushy" in the sense for example as illustrated in FIG. 9. If the desired property is not met, the Orca detour can be aborted and query processing can revert to MySQL query optimization.

It will be readily understood that while the instant application has been discussed with respect have access to a first query optimizer and a second query optimizer, more than two different query optimizers can be used. For example, three different query optimizers can be used wherein during the complexity check there can be an evaluation of which of the three query optimizers would be most beneficial for optimizing the received database query. It is understood that the determination of the most suitable query optimizer can be based on the specific characteristics of the query optimizer, and whether those specific characteristics match, for example through the evaluation of threshold or other evaluation technique, with the query characteristics. For example, a specific characteristic can be based on a speed of execution estimation, wherein a speed of execution estimation can be cost-based, rule-based, ad-hoc or the like.

In some embodiments if the speed execution estimation is to be cost-based, costing of a skeleton plan can be performed after creation thereof. Costing a skeleton plan can be performed in a similar manner as with costing a complete physical plan except that only a subset of the operators, namely the operators in the skeleton plan, need to be costed.

In some embodiments if the speed execution estimation is to be rule-based, one or more rules can be defined. For example, a skeleton plan may be discarded if it contains a "large" table on the right (for example inner) side of any join. In this instance a suitable definition or threshold indicative of a "large" table may be defined.

In some embodiments, the speed of execution estimation is an ad-hoc rule. For example, an ad-hoc rule can be defined such that a skeleton plan must be discarded unless it is balanced to a predetermined threshold. The predetermined threshold for a balanced skeleton plan may be defined as the number of nodes in the left and right subtrees of the root node differing by no more than a threshold value. It may be considered that such balanced trees may be faster to execute than skewed trees.

According to embodiments, the instant application defines the adoption of a skeleton plan to bridge the gap between two query optimizers. An advantageous effect of this is that the two query optimizers may have incompatible physical plan formats, but at the skeleton plan level, they may be made to be mutually compatible. In other words, by adopting a skeleton plan-like structure, many more optimizers can talk among one another.

According to embodiments, the instant application defines that a first query optimizer (X) may be able to benefit from a faster execution plan that the second query optimizer (Y) can produce. An advantageous effect of this is that the plan that Y determines may run faster than a plan that X can produce for a given query. This may result in a faster query response time and may result in a higher system throughput.

According to embodiments, the instant application may avoid costly reworking of a query optimizer by delegating part of the work to a more capable query optimizer. An advantageous effect of this is that this can make a relatively simple query optimizer have access to more capable features without the need for complex reengineering to specifically integrate these more capable features therein. In some embodiments, query optimization delegation work enabled by skeleton plans may extend the life of a simple query optimizer by several years.

According to embodiments, the instant application may provide a query optimizer that is targeted for transaction-oriented workloads (e.g. online transaction processing (OLTP)) may be adopted by analytical (e.g. online analytical processing (OLAP)) workloads. An advantageous effect of this is that relatively simple query optimizers can optimize OLTP workloads well; relatively complex query optimizers can optimize OLAP workloads too. An OLTP-style query optimizer may become OLAP-capable by delegating "complex" queries to an OLAP query optimizer. As a result, the original OLTP system becomes OLAP-capable, and as a result, may perform adequately as a hybrid transactional/analytical processing (HTAP) system.

According to embodiments, the instant application may minimize creating dependencies between two interfaced query optimizers using skeleton plans. An advantageous effect of this is that the physical plans of two query optimizers may be compatible at the skeleton plan level. As a result, the two optimizers may continue to evolve independently of each other. Minimal inter-dependency means that the two optimizer systems can be robust, and that none or substantially minimal cascading effects may be created by changes made to one or both of the optimizer systems.

According to embodiments, a second query optimizer (Y) may be used to fine tune a first query optimizer (X). For example, based on estimated execution costs of query plans generated for such queries by Y, X may determine appropriate values for its own cost model. Examples of these values may include details relating to one or more of how much should a unit of index lookup cost, how much should a unit of index scan cost, and the like. In addition, while X can obtain the estimated execution costs as defined elsewhere herein, X can also execute the queries to determine an actual execution cost. Basing cost model parameter values on estimated and actual execution costs may be more accurate than basing cost model parameter values only on estimated execution costs.

Embodiments of the present disclosure can be implemented using electronics hardware, software, or a combination thereof. In some embodiments, the disclosure is implemented by one or multiple computer processors executing program instructions stored in memory. In some embodiments, the disclosure is implemented partially or fully in hardware, for example using one or more field programmable gate arrays (FPGAs) or application specific integrated circuits (ASICs) to rapidly perform processing operations.

Figure 10:
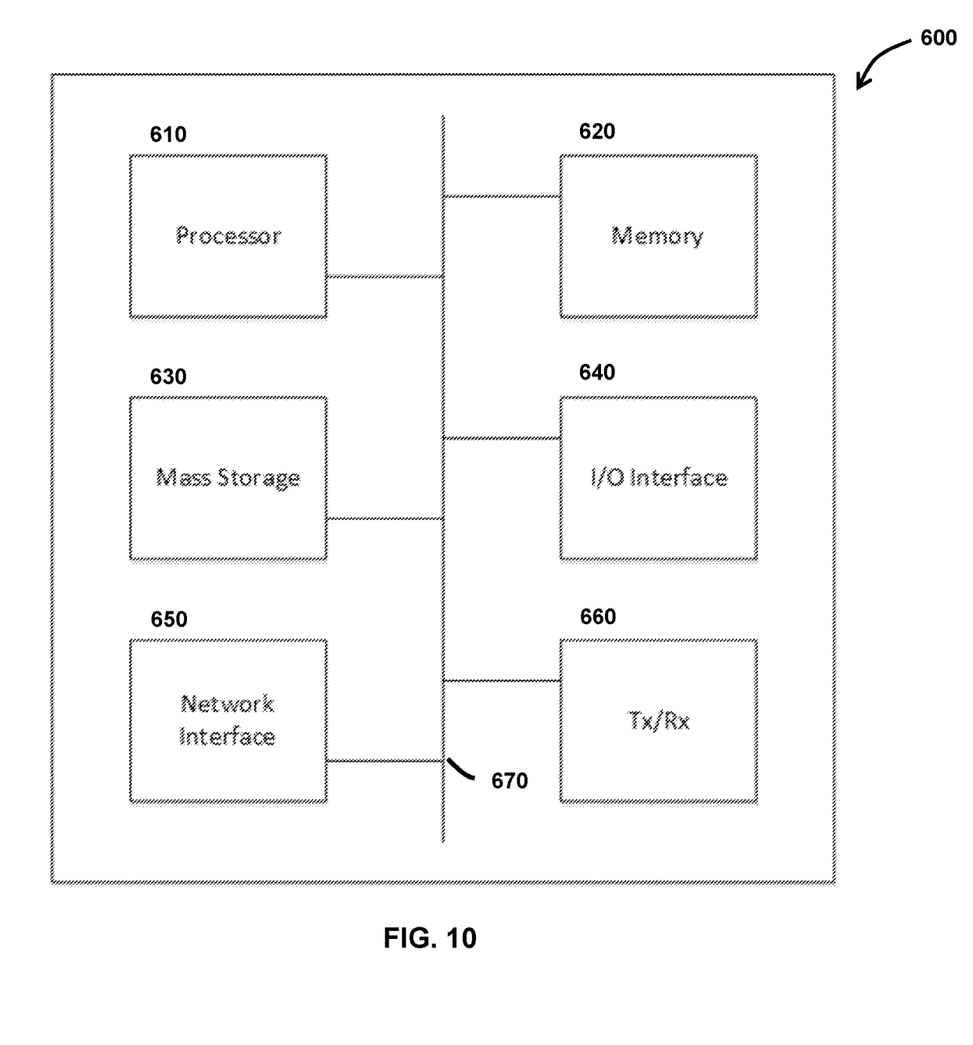
FIG. 10 is a schematic diagram of an electronic device according to embodiments.

FIG. 10 is a schematic diagram of an electronic device 600 that may perform any or all of operations of the above methods and features explicitly or implicitly described herein, according to different embodiments. For example, a computer equipped with network function may be configured as electronic device 600.

As shown, the device includes a processor 610, such as a central processing unit (CPU) or specialized processors such as a graphics processing unit (GPU) or other such processor unit, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or computer program product configured to store data and machine executable program code. According to certain embodiments, the memory 620 or mass storage 630 may have recorded thereon statements and instructions executable by the processor 610 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments. For example, such an execution may correspond to a simulation of the logical operations as described herein. The software product may additionally or alternatively include number of instructions that enable a computer device to execute operations for configuring or programming a digital logic apparatus in accordance with embodiments.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for optimizing a database query, the method comprising:
   receiving a database query by a first query optimizer;
   upon determination that the database query is complex, generating and transmitting information indicative of the database query to a second query optimizer and a third query optimizer;
   receiving from the second query optimizer a first physical plan indicative of the database query;
   receiving from the third query optimizer a second physical plan indicative of the database query;
   selecting the first physical plan or the second physical plan based on matching characteristics of the second query optimizer and the third query optimizer with characteristics of the database query:
   converting the selected physical plan into a skeleton plan associated with the first query optimizer;
   refining the skeleton plan into a physical plan of the first query optimizer; and
   transmitting the physical plan of the first query optimizer to a query executor.

2. The method of claim 1 further comprising:
   upon determination that the database query is non-complex, optimizing the database query into a skeleton plan associated with the first query optimizer;
   refining the skeleton plan into a physical plan of the first query optimizer; and
   transmitting the physical plan of the first query optimizer to a query executor.

3. The method of claim 2 further comprising:
   generating the information indicative of the database query configured as a logical tree associated with the second query optimizer.

4. The method of claim 1 further comprising:
   upon receipt of the database query, performing logical transformations to the database query to generate an abstract syntax tree (AST) format of the database query.

5. The method of claim 4 further comprising:
   preparing for cost-based optimization, including generating a modified AST format of the database query.

6. The method according to claim 1, wherein the information indicative of the database query is configured as a logical tree associated with the second query optimizer.

7. The method according to claim 1, wherein the first query optimizer is selected from the group comprising MySQL, SQL Server, DB2, Oracle, PostgreSQL, Orca and SQLite and wherein the second query optimizer is different from the first query optimizer, the second query optimizer selected from the group comprising MySQL, SQL Server, DB2, Oracle, PostgreSQL, ORCA and SQLite.

8. The method according to claim 1, wherein the database query has associated therewith a number of tables and wherein determining complexity of the database query is at least in part based on the number of tables.

9. The method according to claim 1, wherein determining complexity is at least in part based on a cost associated with the first query optimizer.

10. The method according to claim 1, wherein the selecting is performed based at least in part on characteristics of the second query optimizer, characteristics of the third query optimizer, and characteristics of the query.

11. An apparatus for optimizing a database query, the apparatus comprising:
    a processor; and
    a memory storing thereon machine executable instruction, the instructions when executed by the processor configure the apparatus to:
    receive a database query by a first query optimizer;
    upon determination that the database query is complex, generate and transmit information indicative of the database query to a second query optimizer and a third query optimizer;
    receive from the second query optimizer a first physical plan indicative of the database query;
    receive from the third query optimizer a second physical plan indicative of the database query;
    select the first physical plan or the second physical plan based on matching characteristics of the second query optimizer and the third query optimizer with characteristics of the database query;
    convert the selected physical plan into a skeleton plan associated with the first query optimizer;
    refine the skeleton plan into a physical plan of the first query optimizer; and
    transmit the physical plan of the first query optimizer to a query executor.

12. The apparatus of claim 11, wherein upon determination that the database query is non-complex, the instructions when executed by the processor further configure the apparatus to optimize the database query into a skeleton plan associated with the first query optimizer.

13. The apparatus of claim 12, wherein the instructions when executed by the processor further configure the apparatus to generate the information indicative of the database query configured as a logical tree associated with the second query optimizer.

14. The apparatus of claim 11, wherein upon receipt of the database query, the instructions when executed by the processor further configure the apparatus to perform logical transformations to the database query to generate an abstract syntax tree (AST) format of the database query.

15. The apparatus of claim 14, wherein the instructions when executed by the processor further configure the apparatus to prepare for cost-based optimization, including generate a modified AST format of the database query.

16. The apparatus according to claim 11, wherein the information indicative of the database query is configured as a logical tree associated with the second query optimizer.

17. The apparatus according to claim 11, wherein the first query optimizer is selected from the group comprising MySQL, SQL Server, DB2, Oracle, PostgreSQL, Orca and SQLite and wherein the second query optimizer is different from the first query optimizer, the second query optimizer selected from the group comprising MySQL, SQL Server, DB2, Oracle, PostgreSQL, ORCA and SQLite.

18. The apparatus according to claim 11, wherein a database query has associated therewith a number of tables and wherein determining complexity of a database query is at least in part based on the number of tables.

19. The apparatus according to claim 11, wherein determining complexity is at least in part based on a cost associated with the second query optimizer.

20. The apparatus according to claim 11, wherein the selecting is performed based at least in part on characteristics of the second query optimizer, characteristics of the third query optimizer, and characteristics of the query.

21. A computer program product comprising a computer readable memory storing computer executable instructions thereon that when executed by a computer perform the method for optimizing a database query comprising:
- receiving a database query by the first query optimizer;
- upon determination that the database query is complex, generating and transmitting information indicative of the database query to a second query optimizer and a third query optimizer;
- receiving from the second query optimizer a first physical plan indicative of the database query;
- receiving from the third query optimizer a second physical plan indicative of the database query;
- selecting the first physical plan or the second physical plan based on matching characteristics of the second query optimizer and the third query optimizer with characteristics of the database query;
- converting the selected physical plan into a skeleton plan associated with the first query optimizer;
- refining the skeleton plan into a physical plan of the first query optimizer; and
- transmitting the physical plan of the first query optimizer to a query executor.

* * * * *